: US 8,717,567 B2
(45) Date of Patent: *May 6, 2014

(12) United States Patent
Shannon et al.

(54) METHOD AND APPARATUS FOR CALIBRATING A COLOR MEASUREMENT DEVICE

(75) Inventors: Colman Shannon, Lawrenceville, NJ (US); Dana Gregory, Fairless Hills, PA (US)

(73) Assignee: Datacolor Holding AG, Luzern (CH)

( * ) Notice: Subject to any disclaimer, the term of this patent is extended or adjusted under 35 U.S.C. 154(b) by 0 days.

This patent is subject to a terminal disclaimer.

(21) Appl. No.: 13/223,119

(22) Filed: Aug. 31, 2011

(65) Prior Publication Data

US 2013/0050703 A1    Feb. 28, 2013

(51) Int. Cl.
    *G01J 3/46* (2006.01)

(52) U.S. Cl.
    USPC .......................................... 356/402

(58) Field of Classification Search
    USPC .......................................... 356/402
    See application file for complete search history.

(56) References Cited

U.S. PATENT DOCUMENTS

| | | | |
|---|---|---|---|
| 5,892,585 A | 4/1999 | Lianza et al. | |
| 5,982,501 A * | 11/1999 | Benz et al. | 356/446 |
| 6,058,357 A | 5/2000 | Granger | |
| 6,163,377 A | 12/2000 | Boles et al. | |
| 6,784,995 B2 | 8/2004 | Merle et al. | |
| 6,980,231 B1 | 12/2005 | Ohsawa | |
| 7,133,133 B2 | 11/2006 | Merle et al. | |
| 7,391,514 B2 | 6/2008 | Merle et al. | |
| 7,777,755 B2 | 8/2010 | Marcu et al. | |
| 2005/0007497 A1 | 1/2005 | Huang et al. | |
| 2005/0088389 A1 * | 4/2005 | Ten | 345/88 |
| 2006/0001873 A1 | 1/2006 | Imura | |
| 2006/0181552 A1 | 8/2006 | Hopple | |
| 2006/0215193 A1 | 9/2006 | Shannon et al. | |
| 2006/0233431 A1 | 10/2006 | Watanabe | |
| 2007/0285516 A1 | 12/2007 | Brill et al. | |
| 2008/0309968 A1 | 12/2008 | Berestov et al. | |
| 2009/0141042 A1 * | 6/2009 | Shannon et al. | 345/600 |
| 2012/0253727 A1 | 10/2012 | Lianza et al. | |

OTHER PUBLICATIONS

International Search Report and Written Opinion for PCT/US08/85014, Feb. 4, 2009, consists of 9 unnumbered pages.
International Search Report and Written Opinion from PCT/US12/52870, Dec. 20, 2012, consists of 9 unnumbered pages.

* cited by examiner

*Primary Examiner* — Tarifur Chowdhury
*Assistant Examiner* — Omar Nixon

(57) ABSTRACT

One embodiment of a method for calibrating a test color measurement device in conjunction with an emissive display includes measuring spectral sensitivities of at least four channels of a more-than-three-channel sensor in the test color measurement device, linearly regressing the spectral sensitivities to a least-square best fit to Commission International de l'Éclairage (CIE) color matching functions, wherein the linearly regressing is performed using a weighting function that is based on a square root of a spectral power distribution characteristic of the emissive display or of a type of the emissive display, and computing a set of initial fitting coefficient values from the linearly regressing.

17 Claims, 3 Drawing Sheets

METHOD AND APPARATUS FOR CALIBRATING A COLOR MEASUREMENT DEVICE

BACKGROUND OF THE DISCLOSURE

Color displays, such as liquid crystal displays, tend to undergo color drift during their lifetime, and must be re-calibrated at regular intervals (e.g., using a colorimeter or other color measuring device) to render the proper colors. Conventional techniques for making color measurements of displays, however, tend to be very expensive. For instance, one conventional technique involves using a spectroradiometer (a device that measures light at about thirty wavelengths or more, where the measurements are combinable into Commission International de l'Éclairage (CIE) XYZ tristimulus values). However, the spectroradiometer's number of spectral channels makes its use expensive. Another conventional technique involves using a tristimulus colorimeter (a device that measures light in three channels, through filters whose efficiencies are close to the CIE color-matching functions $\bar{x}(\lambda)$, $\bar{y}(\lambda)$, and $\bar{z}(\lambda)$). However, the design of the tristimulus colorimeter's specific filters makes its use also expensive.

SUMMARY OF THE INVENTION

One embodiment of a method for calibrating a test color measurement device in conjunction with an emissive display includes measuring spectral sensitivities of at least four channels of a more-than-three-channel sensor in the test color measurement device, linearly regressing the spectral sensitivities to a least-square best fit to Commission International de l'Éclairage (CIE) color matching functions, wherein the linearly regressing is performed using a weighting function that is based on a square root of a spectral power distribution characteristic of the emissive display or of a type of the emissive display, and computing a set of initial fitting coefficient values from the linearly regressing. In one embodiment, the display "type" is defined by parameters including one or more of: the display color gamut (e.g., normal or wide gamut) or the backlight technology (e.g., fluorescent tube backlight, white light emitting diode (LED) backlight, or red/green/blue LED backlight).

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one embodiment, the invention is a method and apparatus for calibrating a display-coupled color measurement device, such as a standalone colorimeter that is coupled to a liquid crystal display (LCD), or alternatively a more-than-three-channel light sensor that is coupled to a host computing device (into which the characteristics of an LCD are input and which is functionally a part of the more-than-three-channel light sensor). Embodiments of the invention assume that the color generated by a display can be accurately measured by measuring the display through a plurality of filters, where the exact number of filters used is smaller than the number of spectral channels of a spectroradiometer, but large enough that individual filter spectra do not need to closely approximate the independent linear combinations of the CIE $\bar{x}(\lambda)$, $\bar{y}(\lambda)$, and $\bar{z}(\lambda)$ color matching functions. The calibration of the color measurement device based on this assumption performs a least-squares best fit of the filter-times-detector sensitivity functions to the CIE color matching functions. This technique is less expensive than conventional color measurement techniques. Calibration of the color measurement device may optionally involve an additional second step or level or calibration in which a calibrated display presents known colors that the color measurement device uses to effect a refinement of its color measurements.

Figure 1:
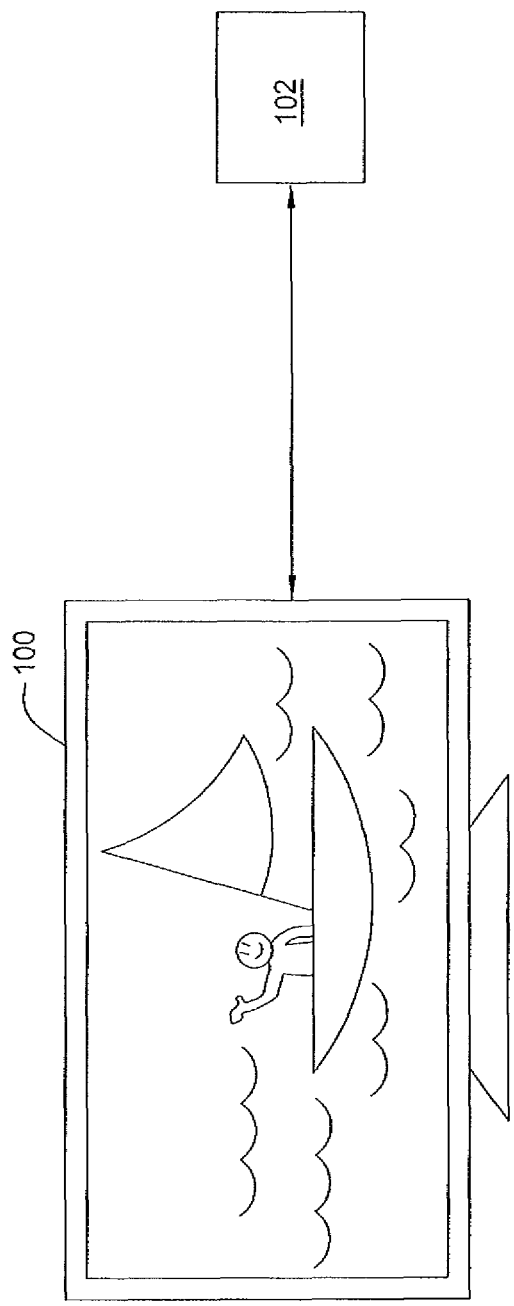
FIG. 1 is a schematic diagram illustrating one embodiment of a system that may be adapted for use in accordance with the present invention.

FIG. 1 is a schematic diagram illustrating one embodiment of a system that may be adapted for use in accordance with the present invention. The system includes a display 100, such as an LCD television or a computer monitor and a color measurement device 102, such as a colorimeter, coupled to the display 100. Optionally, the system may further comprise a host computing device coupled to a more-than-three-channel sensor to comprise the color measurement device 102.

The color measurement device 102 comprises a plurality of channels, where each channel further comprises a filter/detector pair. In one embodiment, the color measurement device comprises at least four channels. Although the color measurement device 102 is illustrated in FIG. 1 as being external relative to the display 100, in alternative embodiments, the color measurement device 102 is embedded in the display 100. In this case, the color measurement device 102 may comprise a single silicon chip fronted by a plurality of integral color filters and detectors.

Figure 2:
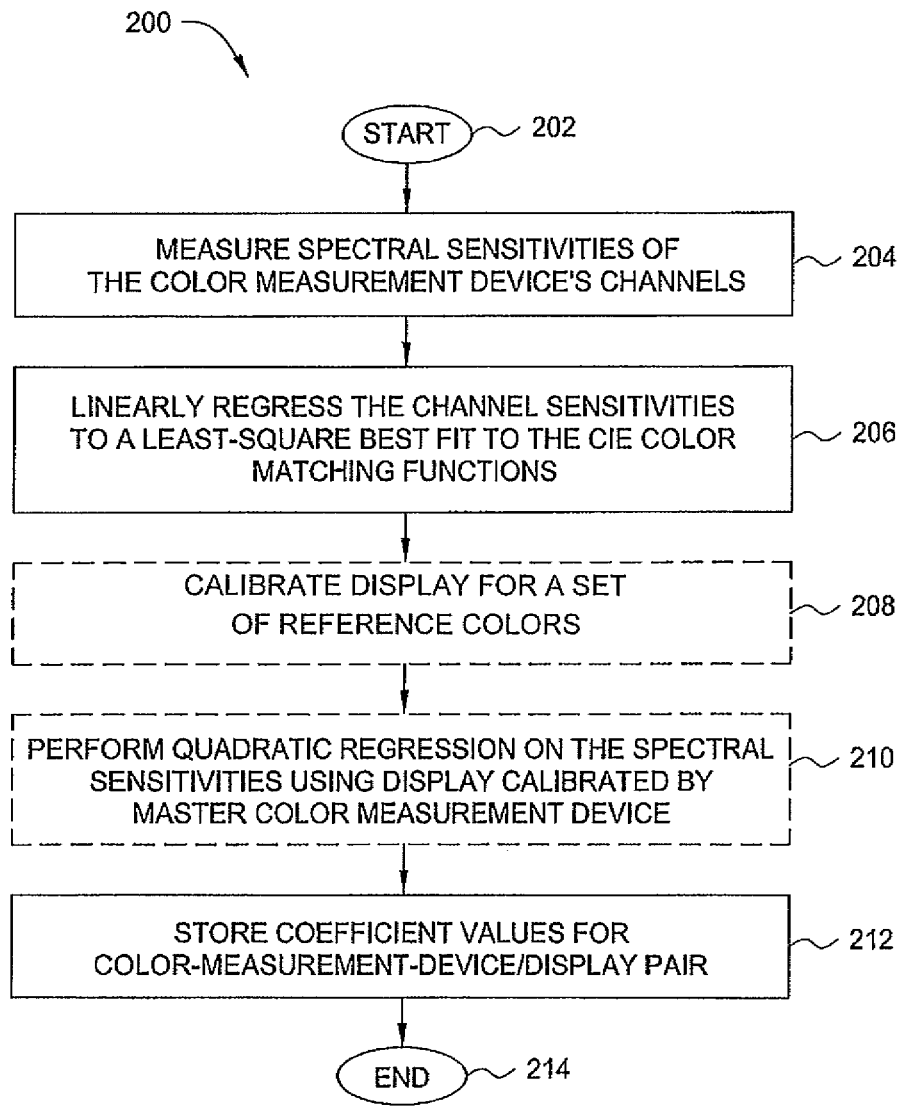
FIG. 2 is a flow diagram illustrating one embodiment of a method for calibrating a display-coupled color measurement device.

FIG. 2 is a flow diagram illustrating one embodiment of a method 200 for calibrating a color measurement device. The color measurement device may, for instance, be coupled to an LCD, as illustrated in FIG. 1.

The method 200 is initialized at step 202 and proceeds to step 204, where the method 200 measures the spectral sensitivities $f_i(\lambda)$ of the color measurement device's channels. In one embodiment, the spectral sensitivities are inferred using a tunable light source, such as a white light coupled with a monochromator. In such an instance, it may be necessary to first calibrate (e.g., offline) the tunable light source before measuring the spectral sensitivities of the color measurement device's channels, since the tunable light source is likely to have an unknown spectral emission at each wavelength. In one embodiment, calibration of the tunable light source involves normalizing the output of the tunable light source by an efficiency of a calibrated light source. In one embodiment, a set of forty-one numbers (e.g., 380 nm to 780 nm in 10 nm increments) is created. This set of numbers comprises weighting factors $U(\lambda)=P_{max}/P(\lambda)$, where $P(\lambda)$ is the power from the tunable light source at wavelength $\lambda$, and $P_{max}$ is the maximum over $\lambda$ of $P(\lambda)$. In one embodiment, the function $P(\lambda)$ is measured by a master spectroradiometer.

Assuming the tunable light source is properly calibrated, in one embodiment, the spectral sensitivities of the color measurement device's channels are inferred by measuring the spectral sensitivities (e.g, with the tunable light source) and then multiplying these measurements by the weighting factors $U(\lambda)$.

In step 206, the method 200 calibrates the color measurement device by linearly regressing the color measurement device's inferred channel sensitivities $f_i(\lambda)$ (each of which is a filter transmission multiplied by a sensor sensitivity) to a least-square best fit to the CIE XYZ color matching functions (i.e., $\bar{x}(\lambda), \bar{y}(\lambda),$ and $\bar{z}(\lambda)$ of the 1931 CIE system). The linear regression allows derivation of initial fitting coefficients $c_{xi}$, $c_{yi}$, and $c_{zi}$ that provide the least-square best fit. For example, $c_x$, is derived by first taking the mean-square residual spectrum to be:

$$F_x(c_{x1}, \ldots, c_{xn}) = \sum_{\lambda=380}^{780} \left[\left\{\sum_{i=1}^{n} c_{xi} f_i(\lambda)\right\} - \bar{x}(\lambda)\right]^2 \quad \text{(EQN. 1)}$$

where $\sum_{\lambda=380}^{780}$ is calculated in 10 nm increments.

In one embodiment, EQN. 1 is modified for LCD applications by a weighting function $w(\lambda)$, as follows:

$$F_x(c_{x1}, \ldots, c_{xn}) = \sum_{\lambda=380}^{780} w^2(\lambda) \left[\left\{\sum_{i=1}^{n} c_{xi} f_i(\lambda)\right\} - \bar{x}(\lambda)\right]^2 \quad \text{(EQN. 2)}$$

where the weighting function $w(\lambda)$ characterizes the display (or display type/model) with which the color measurement device is to be used. That weighting function $w(\lambda)$ is particular to the display or type of display (make and model) with which the color measurement device is used. To solve the least-squares problem, the partial derivatives of $F_x$ in EQN. 1 or in EQN. 2 with respect to $c_{xi}$ are set to zero, and the resulting linear system is solved for $c_{xi}$. $c_{yi}$ and $c_{zi}$ are derived using analogous equations. The solution of the least-squares problem for EQN. 2 is analogous to the solution for EQN. 1, except the elements of a matrix to be inverted and the right-hand side vector are wavelength sums that are now weighted by $w^2(\lambda)$ (see Appendix A). The incorporation of a specific weighting function $w^2(\lambda)$ is made possible by the fact that the weighting function sufficiently characterizes a display type that is known by the user, hence the function $w^2(\lambda)$ can be tailored to a display of that type (in one embodiment, a display white of an LCD). The weighting function $w^2(\lambda)$ allows for a better fit of the inferred channel sensitivities $f_i(\lambda)$ to the CIE XYZ color matching functions in the spectral regions that are most important for the particular display (at the expense of a poorer fit in the spectral regions that are less important).

In one particular embodiment (e.g., for LCD or LED applications), $w(\lambda)$ is the square root of the spectral power distribution from the display screen (i.e., the amount of light emitted by the display as a function of wavelength) as directly measured from the display in the full-white commanded state. In this embodiment, $w^2(\lambda)$ acts as a density function (i.e., spectral power distribution) in the integral whose discrete approximation is optimized in EQN. 2. Hence, if the light spectrum has finite-power spikes of very narrow bandwidths, the integral in EQN. 2 remains finite and non-zero, which is not the case unless $w(\lambda)$ is the square root of such a density function. In addition to outperforming any other tested weighting function, the square-root-of-spectrum choice thus has a desirable analytic behavior relative to other weighting functions.

Steps 204-206 may thus be viewed as a first level of calibration, with resultant output of the first level being the initial fitting coefficients $c_{xi}$, $c_{yi}$, and $c_{zi}$. However, because the plurality of filters incorporated in the channels of the color measurement device may not be a perfect match to the color matching functions $\bar{x}(\lambda), \bar{y}(\lambda)$ and $\bar{z}(\lambda)$, it may be desirable in some embodiments to incorporate a second level of calibration embodied in steps 208-210 in order to refine the initial fitting coefficients $c_{xi}$, $c_{yi}$, and $c_{zi}$.

According to optional embodiments of the present invention (which involve two levels of calibration rather than one, as discussed above), the display 100 is factory-calibrated. In such an optional embodiment, the factory calibrated settings of the display 100 are used to refine the results of the first level of calibration performed by the color measurement device 102. Thus, when the display 100 exhibits color drift in the future, the color measurement device 102 can be used to re-calibrate the display 100 using display- or display-type-specific color data.

Thus, in optional step 208 (illustrated in phantom), the method 200 calibrates the display (i.e., either the display under test or another display of the same make and model) for a set of known reference colors, using a master (reference) color measurement device, such as a spectroradiometer. In one embodiment, the set of known reference colors comprises twenty-six reference colors. The calibration of the display yields a set of target X, Y, and Z tristimulus values for the master color measurement device.

Then in optional step 210 (illustrated in phantom), the method 200 uses the set of reference colors rendered on the calibrated display to perform a quadratic (second-order polynomial) regression on the initial X, Y, and Z tristimulus values associated with the initial fitting coefficients $c_{xi}$, $c_{yi}$, and $c_{zi}$. This produces refined (final) X, Y, and Z tristimulus values. Specifically, the method 200 nonlinearly transforms the initial X, Y, and Z tristimulus values derived from step 206 to improve conformity with the target X, Y, and Z tristimulus values measured from the calibrated display in step 208. The use of specific coefficient values in the above nonlinear transformation is made more effective by the fact that the colorimeter will always measure the same display or display type, hence the coefficient values are tailored to that display or display type (in one embodiment, an LCD).

For example, suppose that the initial X, Y, and Z tristimulus values derived in step 206 for the color j are $X_j$, $Y_j$, and $Z_j$ (where j=1, M; and M is the number of reference colors in the set of reference colors). Further suppose that the target X, Y, and Z tristimulus values derived in step 208 are $X_{Tj}$, $Y_{Tj}$, and $Z_{Tj}$. The object of step 208 is therefore to find the twenty-seven constants (refined fitting coefficients) $k_{xi}$, $k_{yi}$, and $k_{zi}$ (i=1, 8) that produce the least-square best fit to $X_{Tj}$, $Y_{Tj}$, and $Z_{Tj}$ of the respective quantities:

$$X_{fj} = k_{x1}X_j + k_{x2}Y_j + k_{x3}Z_j + k_{x4}X_jY_j + k_{x5}X_jZ_j + k_{x6}Y_jZ_j + k_{x7}X_j^2 + k_{x8}Y_j^2 + k_{x9}Z_j^2$$

$$Y_{fj} = k_{y1}X_j + k_{y2}Y_j + k_{y3}Z_j + k_{y4}X_jY_j + k_{y5}X_jZ_j + k_{y6}Y_jZ_j + k_{y7}X_j^2 + k_{y8}Y_j^2 + k_{y9}Z_j^2$$

$$Z_{fj} = k_{z1}X_j + k_{z2}Y_j + k_{z3}Z_j + k_{z4}X_jY_j + k_{z5}X_jZ_j + k_{z6}Y_jZ_j + k_{z7}X_j^2 + k_{z8}Y_j^2 + k_{z9}Z_j^2$$

where these expressions are non-linear in the measured X, Y, and Z tristimulus values, but linear in the fitting coefficients $k_{xi}$, $k_{yi}$, and $k_{zi}$. Therefore, one can easily solve for the fitting coefficients.

In one embodiment, the method 200 defines an M×9 matrix, D, of color measurement device-measured X, Y, Z tristimulus values from the M test colors. The $j^{th}$ row vector of D is:

$$D_j = [X_j Y_j Z_j X_j Y_j X_j Z_j X_j^2 Y_j^2 Z_j^2]$$ (EQN. 3)

In one embodiment, the method 200 defines a 3×9 matrix, C, of refined fitting coefficients to be solved as:

$$C = \begin{bmatrix} k_{x1} & k_{x2} & k_{x3} & k_{x4} & k_{x5} & k_{x6} & k_{x7} & k_{x8} & k_{x9} \\ k_{y1} & k_{y2} & k_{y3} & k_{y4} & k_{y5} & k_{y6} & k_{y7} & k_{y8} & k_{y9} \\ k_{z1} & k_{z2} & k_{z3} & k_{z4} & k_{z5} & k_{z6} & k_{z7} & k_{z8} & k_{z9} \end{bmatrix}$$ (EQN. 4)

In one embodiment, the method 200 defines an M×3 matrix, B, of target X, Y, and Z tristimulus values, whose $j^{th}$ row is given by:

$$B_j = [X_{Tj} Y_{Tj} Z_{Tj}]$$ (EQN. 5)

The least-square problem is then to find C such that, as closely as possible:

$$B = DC^T$$ (EQN. 6)

where T stands for matrix transposition. The solution for C is to apply the pseudoinverse of D to both sides of EQN. 6:

$$C^T = (D^T D)^{-1} D^T B$$ (EQN. 7)

In step 212, the method 200 stores the fitting coefficients (i.e., the initial fitting coefficients, if only one level of calibration is implemented, and the refined fitting coefficients, if two levels of calibration are implemented) for the color measurement device/display type pair. In one embodiment, the fitting coefficients are stored in the color measurement device or a host computing device coupled thereto. The method 200 then terminates in step 214.

The storage of the fitting coefficients allows them to be used as a lookup table for future calibrations with the color measurement device on the display or display type. Given a matrix C computed from EQN. 7, the refined tristimulus values ($X_f$, $Y_f$, and $Z_f$) of any color subsequently measured by the color measurement device on the display or another display of the same type are computed from the initial tristimulus values (X, Y, and Z, e.g., as derived in step 206) by:

$$[X_f Y_f Z_f] = [XYZXYXZYZX^2 Y^2 Z^2] C^T$$ (EQN. 8)

Applied to a scanner of reflecting samples (e.g., as described by Jon Y. Hardeberg in Chapter 3 of "Acquisition and Reproduction of Color Images: Colorimetric and Multi-spectral Approaches," first (French) edition published in 1999 by Ecole Nationale Superieure de Telecommunications, Paris; second (English) edition published in 2001 by Universal Publishers, Parkland, Fla., which is herein incorporated by reference in its entirety), the method 200 achieves accuracy of between two and three CIELAB ΔE values from a second-order regression. Even greater accuracy is achievable when one uses a color measurement device having more than three channels (as a stand-in for the scanner) to perform steps 204-206 and then measures a display that is inherently designed with only three degrees of freedom in its control. This holds even if the scanner or color measurement device is a completely linear device whose linearity is compromised by the second-order polynomial regression of step 210.

Relative to the process described by Hardeberg (supra), in the embodiment defined herein, the constant terms in the second-order polynomial regression are set to zero, leaving twenty-seven coefficients to determine. This preserves the black point independently of the test colors, effectively giving black a very high weight. This can prove advantageous for display applications.

In one embodiment of the present invention, the color measurement device is not just coupled to a single display, but is actually embedded in the display. For example, the color measurement device may be embedded in the screen-opposing surface of a hinged display system, such as a cellular telephone keypad or a laptop computer, such that when the hinge is closed, the measurement and calibration processes can occur in a substantially ambient light-free environment. In another embodiment, the color measurement device is coupled to a hinged display, but not embedded therein. In yet another embodiment, the color measurement device is attached to an attachment arm of the display (e.g., as in the case of a stand-alone display).

In one embodiment of the present invention, the color measurement device is not physically coupled to the display, but is calibrated to several alternative kinds of displays, and the fitting coefficients for each of the separate displays are stored in the color measurement device or in a host computing device coupled to the color measurement device. For example, the initial fitting coefficients derived from first level calibration (i.e., steps 204-206 of the method 200) from "display A" and "display B" are stored as "display-A" and "display-B" alternatives in the color measurement device, and a user specifies whether the display is display A or display B. The color measurement device automatically adopts the appropriate fitting coefficients in response to the user specification of the display.

In another embodiment, there are three locations at which digital information may be computed or stored: in the calibration station (at which many color measurement devices are calibrated), in the more-than-three-channel light sensor, and in the application dynamic-link library (DLL) in the host computing device that serves the color measurement device. In one particular embodiment, the calibration station measures (and optionally stores) the filter-times-channel-response functions $f_i(\lambda)$ of the more-than-three-channel light sensor (e.g., 7×41 values); the more-than-three-channel light sensor receives and stores the filter-times-channel-response function $f_i(\lambda)$ values, which the more-than-three-channel light sensor provides to the host computing device; and the DLL in the host computing device stores the weighting function $w(\lambda)$ of EQN. 2 for each designated category of display that the more-than-three-channel light sensor will later measure. Thus, in this embodiment, although the more-than-three-channel light sensor stores its filter-times-channel-response functions $f_i(\lambda)$, it does not store display-dependent data.

Given a user-selected category of display and its associated weighting function $w(\lambda)$, the DLL computes and stores the fitting coefficients (e.g., the n=7 first level calibration coefficients $c_{xi}$ of EQN. 2; the 2n=14 first level calibration coefficients $c_{yi}$ and $c_{zi}$ implied by EQN. 2; and, if second level calibration is performed, the 3×9 matrix C of EQN. 4). The DLL also uses the fitting coefficients to compute color measurement device measurements $F_i$ of a display into X, Y, Z values, which the host computing device then uses for display calibration.

The use of the more-than-three-channel light sensor to store the filter-times-channel-response function $f_i(\lambda)$ values provides flexibility in the event that a fielded, already-calibrated color measurement device must measure a display of a newly characterized display type. In such an instance, a new weighting function w(λ) can be easily imported from outside the host computing device. Thus, more-than-three-channel light sensors and host computing devices can be replaced without impacting performance (e.g., there is no concern that the host computing device is storing $f_i(\lambda)$ values associated with the "wrong" more-than-three-channel light sensor). Within the context of the present invention, the "display category" is defined according to categories of screen-white spectral power distributions $w^2(\lambda)$. A display type can be as specific as a display make and model, but broader category definitions are possible based on the nominal gamut and back-light of the display (e.g., normal-gamut cold-cathode fluorescent lamp (CCFL)-backlit, wide-gamut CCFL-backlit, wide-gamut red-green-blue (RGB)-LED-backlit, or normal-gamut white-LED-backlit).

In certain instances of this embodiment, it may be advantageous to skip second level calibration as described above. Although second level calibration improves accuracy, it is time consuming as it requires an extra calibration step. Moreover, the performance of second level calibration may be sensitive to the make and model of the display being measured. That is, although second level calibration yields excellent results when measuring the target display of the second level calibration, the second level calibration is less effective when measuring a display that is different from the target display (even if the different display and the target display are of the same display type as defined herein).

First level calibration with the square-root weighting function described above improves accuracy so significantly that the further improvement that can be obtained through second level calibration may not be worth the consequent sensitivity of the performance to the display make and model. First level calibration using the square-root weighting function, and in the absence of second level calibration, performs accurately over broad types of display (where "display types" are defined by their screen-white spectral power distributions, as discussed above). This allows more flexibility of use with less calibration effort.

Figure 3:
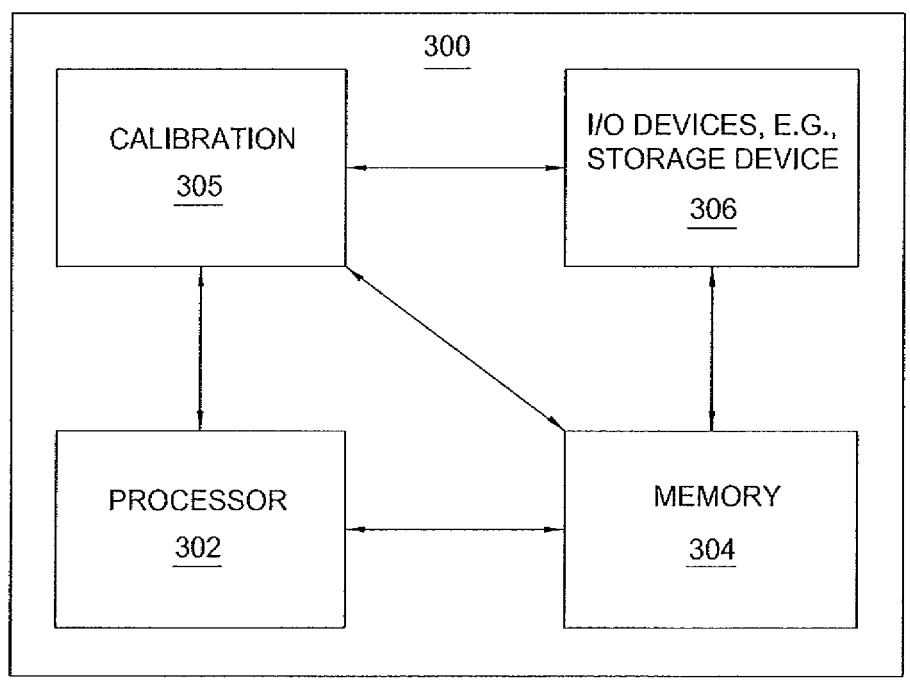
FIG. 3 is a high level block diagram of the calibration method that is implemented using a general purpose computing device.

FIG. 3 is a high level block diagram of the calibration method that is implemented using a general purpose computing device 300. In one embodiment, a general purpose computing device 300 comprises a processor 302, a memory 304, a calibration module 305 and various input/output (I/O) devices 306 such as a display, a keyboard, a mouse, a modem, a network connection and the like. In one embodiment, at least one I/O device is a storage device (e.g., a disk drive, an optical disk drive, a floppy disk drive). It should be understood that the calibration module 305 can be implemented as a physical device or subsystem that is coupled to a processor through a communication channel.

Alternatively, the calibration module 305 can be represented by one or more software applications (or even a combination of software and hardware, e.g., using Application Specific Integrated Circuits (ASIC)), where the software is loaded from a storage medium (e.g., I/O devices 306) and operated by the processor 302 in the memory 304 of the general purpose computing device 300. Additionally, the software may run in a distributed or partitioned fashion on two or more computing devices similar to the general purpose computing device 300. Thus, in one embodiment, the calibration module 305 for calibrating a color measurement device for use with a display or display type described herein with reference to the preceding Figures can be stored on a computer readable medium or carrier (e.g., RAM, magnetic or optical drive or diskette, and the like).

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in the accompanying Figures that recite a determining operation or involve a decision, do not necessarily require that both branches of the determining operation be practiced. In other words, one of the branches of the determining operation can be deemed as an optional step.

Although various embodiments which incorporate the teachings of the present invention have been shown and described in detail herein, those skilled in the art can readily devise many other varied embodiments that still incorporate these teachings.

APPENDIX A

Solution to the Weighted Least-Square Problem

From EQN. 2, the quantity to be minimized is:

$$F_x(c_{x1}, \ldots , c_{xn}) = \sum_{\lambda=380}^{780} w^2(\lambda)\left[\left\{\sum_{i=1}^{n} c_{xi}f_i(\lambda)\right\} - \bar{x}(\lambda)\right]^2 \quad (A1)$$

Abbreviating the wavelength sum to "< >" results in:

$$F_x(c_{x1}, \ldots , c_{xn}) = \left\langle w^2\left[\left\{\sum_{i=1}^{n} c_{xi}f_i\right\} - \bar{x}\right]^2\right\rangle \quad (A2)$$

Setting to zero the partial derivative of $F_x$ with respect to yields $c_{xj}$ yields:

$$\sum_{i=1}^{n} \langle f_j f_i w^2\rangle c_{xi} = \langle f_j \bar{x} w^2\rangle \quad (A3)$$

Now denote by M the n-by-n matrix with components $M_{ij} = \langle f_j f_i w^2 \rangle$; denote by $c_x$ the n-vector with components $c_{xi}$; and denote by $v_x$ the n-vector with components $v_{xi} = \langle f_i \bar{x} w^2 \rangle$. Then:

$$Mc_x = v_x \quad (A4)$$

which can be multiplied by the inverse of M to yield a solution for the coefficient vector:

$$c_x = M^{-1}v_x \quad (A5)$$

This treatment applies to computations for x coefficients $c_x$. Directly analogous computations apply to y and z coefficients $c_y$ and $c_z$.

What is claimed is:

1. A method for calibrating a test color measurement device, comprising:
   measuring spectral sensitivities of at least four channels of a more-than-three-channel sensor in the test color measurement device;
   linearly regressing the spectral sensitivities to a least-square best fit to Commission International de l'Éclairage (CIE) color matching functions, wherein the linearly regressing is performed using a weighting function that is based on a square root of a spectral power distribution characteristic of the emissive display or of a type of the emissive display;

computing a set of initial fitting coefficient values from the linearly regressing, wherein at least one of: the measuring, the linearly regressing, or the computing is performed using a processor.

2. The method of claim 1, further comprising:

measuring CIE tristimulus values of a set of known reference colors on the emissive display using a reference color measurement device;

measuring the CIE tristimulus values on the emissive display using the test color measurement device; and transforming the CIE tristimulus values as measured by the test color measurement device to the CIE tristimulus values as measured by the reference color measurement device, using a nonlinear function with variable fitting coefficients, wherein the measuring the CIE tristimulus values of a set of known reference colors, the measuring the CIE tristimulus values on the emissive display, and the transforming are performed prior to the storing.

3. The method of claim 1, wherein the spectral power distribution of the emissive display is directly measured from the emissive display or the type of the emissive display when the emissive display or the type of the emissive display is in a full-white state.

4. The method of claim 1, wherein measuring the spectral sensitivities comprises:

measuring the spectral sensitivities; and multiplying the spectral sensitivities by a set of weighting factors.

5. The method of claim 1, wherein the weighting function values are stored in the emissive display.

6. The method of claim 1, wherein the test color measurement device is physically coupled to the emissive display.

7. The method of claim 6, wherein the test color measurement device is embedded in the emissive display.

8. The method of claim 1, wherein the weighting function is stored at a host computing device that is functionally part of the test color measurement device.

9. The method of claim 8, wherein the weighting function is stored in a dynamic link library of the host computing device.

10. The method of claim 1, wherein the initial fitting coefficient values are stored at a host computing device that is functionally part of the test color measurement device.

11. The method of claim 1, wherein the test color measurement device stores one or more values characterizing a filter-times-channel-response function of the test color measurement device.

12. The method of claim 11, wherein the one or more stored values are stored in the more-than-three-channel sensor in the test color measurement device.

13. A non-transitory computer readable storage medium containing an executable program for calibrating a test color measurement device, where the program performs steps of:

measuring spectral sensitivities of at least four channels of a more-than-three-channel sensor in the test color measurement device;

linearly regressing the spectral sensitivities to a least-square best fit to Commission International de l'Éclairage (CIE) color matching functions, wherein the linearly regressing is performed using a weighting function that is based on a square root of a spectral power distribution characteristic of the emissive display or of a type of the emissive display;

computing a set of initial fitting coefficient values from the linearly regressing.

14. The non-transitory computer readable storage medium of claim 13, further comprising:

measuring CIE tristimulus values of a set of known reference colors on the emissive display using a reference color measurement device;

measuring the CIE tristimulus values on the emissive display using the test color measurement device; and transforming the CIE tristimulus values as measured by the test color measurement device to the CIE tristimulus values as measured by the reference color measurement device, using a nonlinear function with variable fitting coefficients, wherein the measuring the CIE tristimulus values of a set of known reference colors, the measuring the CIE tristimulus values on the emissive display, and the transforming are performed prior to the storing.

15. The non-transitory computer readable storage medium of claim 13, wherein measuring the spectral sensitivities comprises:

measuring the spectral sensitivities; and multiplying the spectral sensitivities by a set of weighting factors.

16. The non-transitory computer readable storage medium of claim 13, wherein the test color measurement device stores one or more values characterizing a filter-times-channel-response function of the test color measurement device.

17. The non-transitory computer readable storage medium of claim 16, wherein the one or more stored values are stored in the more-than-three-channel sensor in the test color measurement device.

* * * * *